United States Patent [19]
Lee

[11] Patent Number: 5,416,761
[45] Date of Patent: May 16, 1995

[54] RECORDING DISC CLEANING DEVICE

[76] Inventor: Jeen-Ju Lee, 4th Floor, No. 1, Alley 2, Syh-Wei Lane, Chung-Chen Road, Hsin-Tien City, Taipei Hsien, Taiwan, Prov. of China

[21] Appl. No.: 186,644

[22] Filed: Jan. 26, 1994

[51] Int. Cl.⁶ ................................................ G11B 3/58
[52] U.S. Cl. ...................................................... 369/72
[58] Field of Search ............... 369/72, 73, 74, 71; 360/128; 15/DIG. 13, 256.5

[56] References Cited
U.S. PATENT DOCUMENTS

| | | | |
|---|---|---|---|
| 3,545,768 | 12/1970 | Fortune | 369/72 |
| 4,449,214 | 5/1984 | Rangabe | 369/72 |
| 4,535,432 | 8/1985 | Niles et al. | 369/72 |
| 4,825,497 | 5/1989 | Nagao et al. | 369/72 |
| 5,146,382 | 9/1992 | Yao-Ko | 360/128 |

FOREIGN PATENT DOCUMENTS 62-20188  1/1987  Japan ........................ 369/72

*Primary Examiner*—Stuart S. Levy
*Assistant Examiner*—William R. Korzuch
*Attorney, Agent, or Firm*—Morton J. Rosenberg; David I. Klein

[57] ABSTRACT

An automatic cleaning device is provided to clean the surface of a digital signal recording disc. The cleaning device includes a driving mechanism having a crank slide block to drive a cleaning component across a disc surface in a radial direction to wipe the disc surface. The cleaning components of the cleaning device are movable and contact the disc respectively in a reversible manner so that the surface of the disc is alternately wiped in a dry or wet state to optimize the cleaning effect.

7 Claims, 6 Drawing Sheets

RECORDING DISC CLEANING DEVICE

FIELD OF THE INVENTION

This invention relates to an automatic cleaning device. More particularly, this invention is directed to a cleaning device for cleaning the surface of a digital signal recording disc, such as a laser compact disc, video disc, or computer compact disc.

BACKGROUND OF THE INVENTION

Currently, all types of commercial laser CDs, video discs, and computer light discs use disc technology to record digitized signals on different types of discs. These digitized signals are represented by recesses formed in the discs. A protective and transparent coating is applied to the surfaces of these recesses. When the signals are read or picked up, the disc is first irradiated with a laser beam on the surface of the disc and then the signals represented by the reflective beam are read. Though the surface of the disc is protected by a protective and transparent coating, and even though the reading head or the pick-up head do not touch the surface when they read or pick up the signals, nevertheless there is an accumulation of dust, fingerprints, and moisture which have a detrimental effect on the reading and picking-up of the signals from the reflected laser beam. Therefore, it is necessary that the disc surface must be cleaned on a periodic basis.

Because the recesses formed in the disc are aligned in a spiral contour approximating a circle, when cleaning a disc, it should not be wiped in a circular direction; otherwise, the surface will be scratched or warped and the laser beam may not be able to read or pick up accurately the signals on the disc. In this case, the disc will not be maintained in good operating condition and it may "skip" or "stick" or will not play at all. Therefore, it is disadvantageous to wipe the disc in the same direction as its signal representative recesses are directed. Thus, it is recommended to wipe in a circular direction. The larger the intersection angle formed between the wiping direction and the aligned lines of recesses results in optimized cleaning, and the best wiping direction is perpendicular to those lines.

When cleaning the disc, it is better to use both dry and wet components to wipe the disc alternatively, resulting in an optimized cleaning effect.

It is therefore the object of this invention to provide a cleaning device for cleaning the surface of a digital signal recording disc which provides a cleaning element which can wipe the disc in a direction substantially perpendicular to the nearly circular lines of signal representative recesses on the disc surface; that is, the wiping direction and the signal line form a 90 degree intersection angle defining an overall radial direction.

It is another object of the invention to use the cleaning element to do the dry and wet cleaning alternatively for the disc, so that the cleaning element has an optimized effect on cleaning.

SUMMARY OF THE INVENTION

An automatic cleaning device for a digital signal recording disc is provided which includes a base having at least a leading track and a disc-bearing mechanism for mounting the digital signal recording disc to be cleaned. A leading track is installed along the direction radial to the disc with at least a unit of cleaning components slidingly displaceable on the leading track, in order that they can slide along the track between the edge and the center of the disc. A driving mechanism is mounted between the cleaning component and the base so as to transfer the rotary motion into a reversible straight-line motion and drive the cleaning element in either of two opposing directions along the leading track. A motor is secured on the base and connected to the driving mechanism to drive the driving mechanism. An intermittent rotary mechanism mounted between the motor and the disc-bearing mechanism rotates the disc-bearing mechanism intermittently and further rotates the digital signal recording disc. An upper cap has one side pivoted to one side of the base by means of a pivot shaft.

The cleaning component of the automatic cleaning device for the disc includes a sliding member slidingly mounted on the leading track of the base and a cleaning element clamping stand installed on the sliding member with the clamping stand having limited displacement to slide forward and backward relative to the sliding member. A cleaning element is inserted in the cleaning element clamping stand and can be dismounted from the clamping stand. An elastic member is fitted between the clamping stand and sliding member so that there will be flexibility between the clamping stand, the cleaning element, and the sliding member. When the cleaning element slides from the center of the disc toward the disc edge, the cleaning element is inclined in the direction opposite to the sliding direction so that a first edge of the cleaning element touches the surface of the disc and another second edge of the cleaning element will separate from the surface of the disc. When the cleaning element slides in the reverse direction, from the edge of the disc toward the disc center, the cleaning element again inclines in the direction opposite to the sliding direction so that the second edge of the cleaning element will touch the surface of the disc and the first edge of the cleaning element will separate from the surface of the disc. Cleaning solutions can be dropped on one side of the cleaning element, and thus the surface of the disc can be alternatively wiped in a dry and a wet fashion.

The automatic cleaning device for a digital signal recording disc further includes a unit of a lock mechanism, having a latch mounted either on the other side of the upper cap, or on one side of the base. A lock member is slidingly mounted either on the other side of the upper cap, or on a side of the base not bearing the latch. The lock member has a lock portion which can lock up with the latch and an elastic member mounted between the lock member and an upper cap. Positioning may be between the lock member and the base so as to force the lock member to remain in a locking position and allow the lock portion of the lock member to lock up with the latch and separate the lock portion of the lock member from the latch by downward displacement of the lock member.

The automatic cleaning device for a digital signal recording disc of the present invention provides a device wherein the leading track is a straight line track.

The automatic cleaning device for a digital signal recording disc of the present invention provides a device wherein the disc-bearing mechanism includes a first disc-clamping member secured on the intermittently rotary mechanism which rotates with the rotary mechanism intermittently. A second disc-clamping member is pivoted below the upper cap and is relatively positioned to the first disc-clamping member to clamp the disc between the first and the second disc-clamping member and the upper cap so as to clamp the disc between the first and the second disc-clamping members by means of the second disc-clamping member.

The automatic cleaning device for a digital signal recording disc of the present invention provides a device wherein the driving mechanism includes a crank slide block.

The automatic cleaning device for a digital signal recording disc of the present invention provides a device wherein the tracks are quadrantly installed.

The automatic cleaning device for a digital signal recording disc of the present invention provides a device where the intermittently rotary mechanism includes a gear secured to the second disc-clamping member and a sector gear having at least one fully shaped tooth so as to mesh with the gear in an intermittent manner.

The automatic cleaning device for a digital signal recording disc of the present invention further includes a sink-and-float mechanism having a sink-and-float track installed near the leading track, with the sink-and-float track having a floating portion and a sinking portion wherein floating portion connects with the sinking portion, and the sinking portion is located at one end or both ends of the leading track. A guided portion is installed at both ends of the cleaning component and cooperates with the sinking track in a sliding manner so that when it slides to the floating portion, the cleaning element will float up and contact the surface of the disc. Alternately, when it slides to the sinking portion the cleaning element will be pressed down by the sinking portion and separate from the surface of the disc.

The automatic cleaning device for a digital signal recording disc of the present invention includes a sinking portion installed at the center or at the edge of the base, as well as a guided portion installed on the cleaning component. The guided portion can be inserted into the sinking portion and sunk by the sinking portion so that the cleaning element will be separate from the surface of the disc

DETAILED DESCRIPTION OF THE PREFERRED EMBODIMENT

Figure 1:
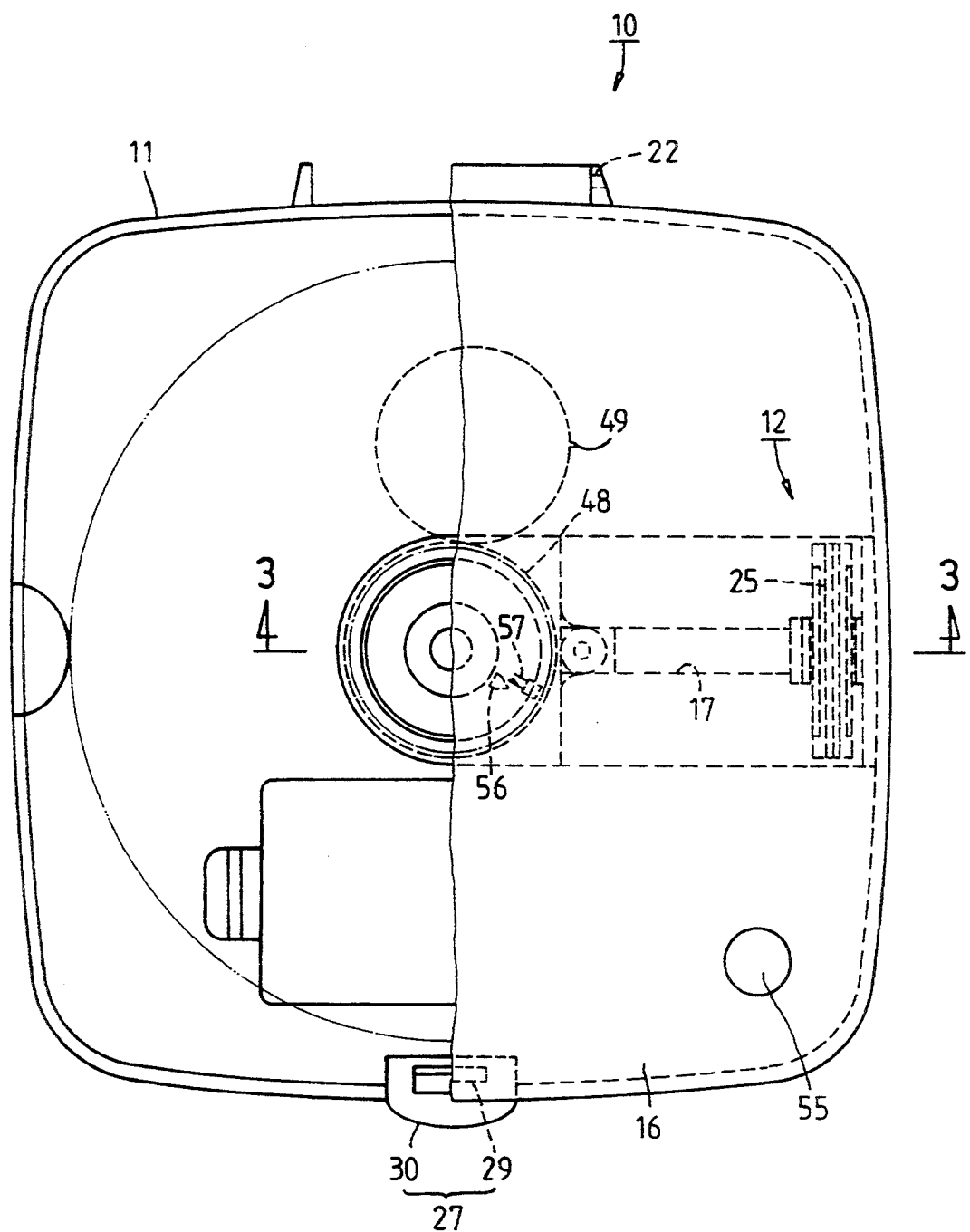
FIG. 1 is a top plan view partially cut-away of the automatic cleaning device of this invention.
Figure 2:
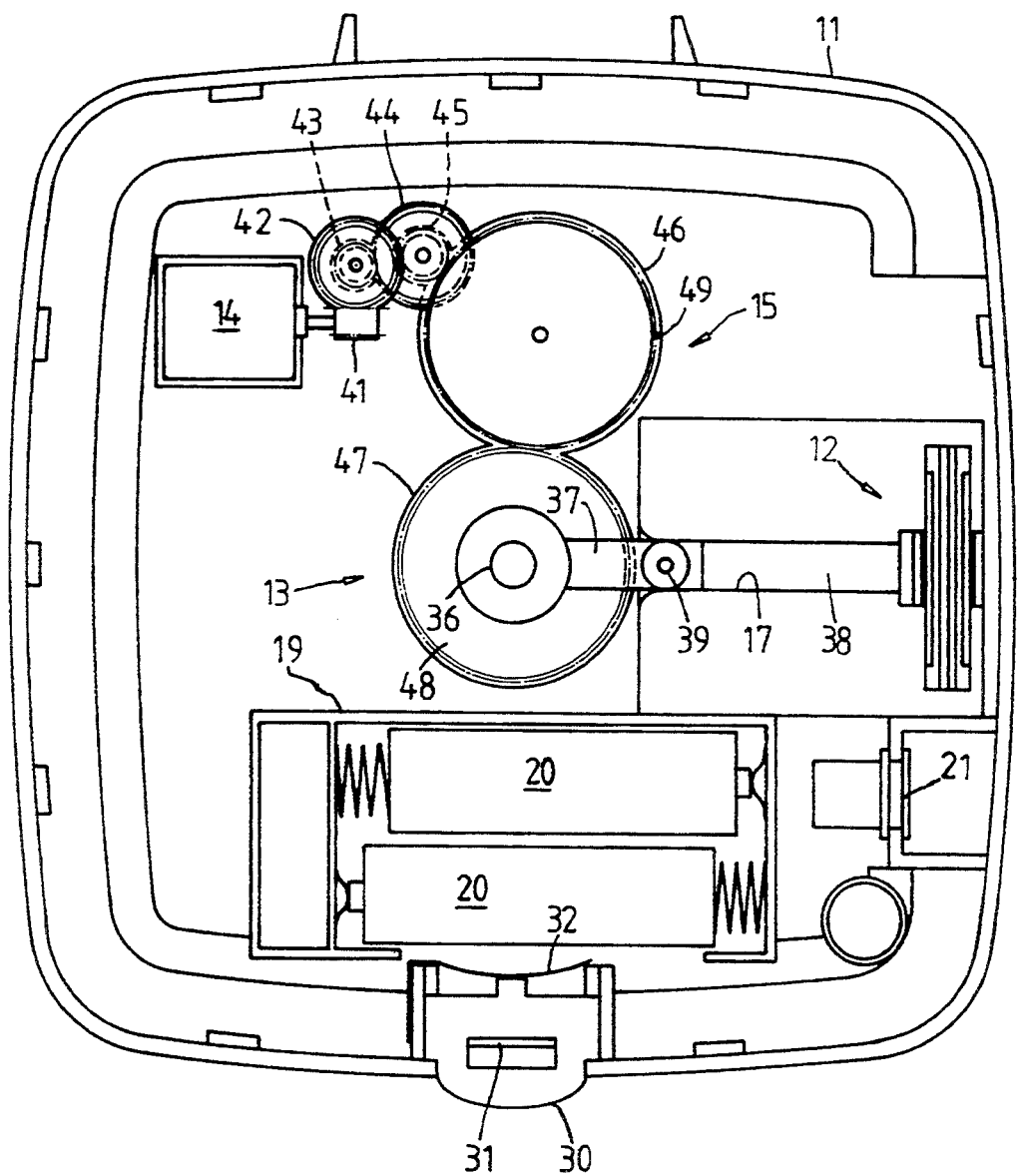
FIG. 2 is a top plan view of the invention with the upper and front caps removed.
Figure 3:
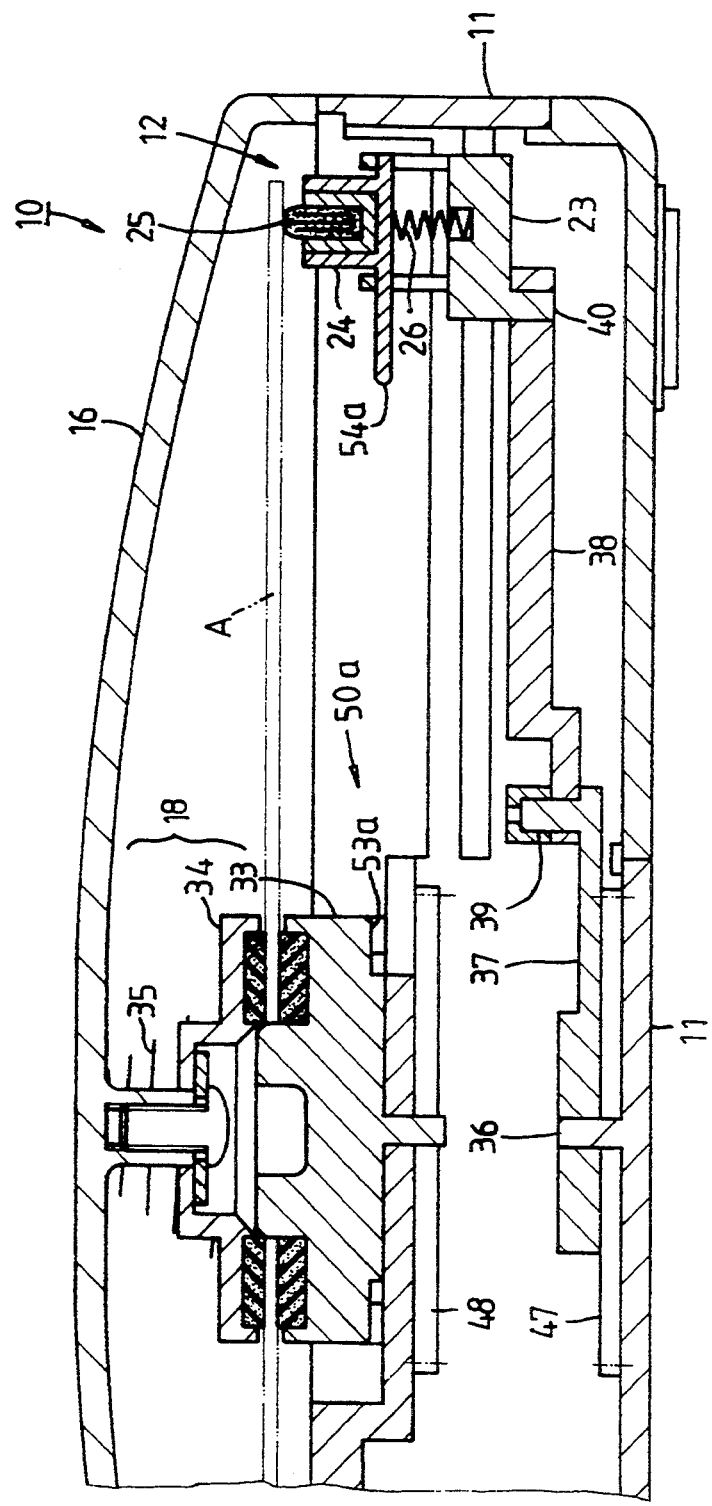
FIG. 3 is a sectional view taken along the section line 3—3 of FIG. 1.

Referring now to FIGS. 1, 2 and 3, there is shown automatic cleaning device 10 for cleaning a digital signal recording disc which includes a base 11, cleaning components 12, a driving mechanism 13, a motor, an intermittent rotary mechanism 15, and an upper cap 16. The base 11 has at least one leading track 17 and a disc-bearing mechanism 18 for mounting the digital signal recording disc A to be cleaned. The leading track 17 is installed along a radial direction with respect and defined by the circular disc.

The cleaning components 12 are mounted and slidingly displaceable on the leading track 17 so that they can slide along the track 17 between the edge and the center of the disc A.

The driving mechanism 13 is mounted between the cleaning component 12 and the base 11 in order to transformer the rotary motion into a linear motion and drive the cleaning element 12 in either of two opposing directions along the leading track 17.

The motor 14 is secured to the base and connected with the driving mechanism 13 to drive the driving mechanism 13. The power for the motor 14 can be provided by a battery 20 disposed on the battery stand 19, or by connecting to an external power source through a socket 21.

The intermittent rotary mechanism 15 is mounted between the motor 14 and the disc-bearing mechanism 18 and rotates the disc-bearing mechanism 18 intermittently and further rotates the digital signal recording disc A.

The upper cap 16 has one side pivoted to one side of the base 11 by means of a pivot shaft 22.

The cleaning component 12 of the automatic cleaning device for the disc has a sliding member 23 slidingly mounted on the leading track 17 of the base 11. A cleaning element clamping stand 24 is installed on the sliding member 23 with the clamping stand 24 having a limited displacement to slide forward and backward relative to the sliding member 23. A cleaning element 25 is inserted in the cleaning element clamping stand 24. An elastic member 26 is positioned between the clamping stand 24 and the sliding member 23 in order to provide flexibility between the clamping stand 24, the cleaning element 25, and the sliding member 23. When the cleaning element 25 slides from the center of the disc A toward the edge of the disc, the cleaning element 25 inclines in a direction opposite to the sliding direction so that one edge of the cleaning element 25 will contact the surface of the disc A and the other edge of the cleaning element 25 will be separated from the surface of the disc A. When the cleaning element 25 slides from the edge of the disc A toward the center of the disc, the cleaning element 25 again inclines in a direction opposite to the sliding direction so that the edge of the cleaning element 25 which formerly was not touching the disc now contacts the surface of the disc A and the other edge of the cleaning element 25 will be separated from the surface of the disc A. Cleaning solutions can be dropped on one side of the cleaning element 25 and in this way the surface of the disc A can be alternately wiped by both a dry edge and a wet edge.

The automatic cleaning device 10 for a digital signal recording disc further includes a unit of lock mechanism 27 having a latch 29 mounted on either of the opposing sides of the upper cap 16 or the base 11. A lock member 30 is slidingly mounted either on one side of the upper cap 16 or the base 11, depending on which the latch 29 is mounted, the lock member being mounted opposite the latch. The lock member 30 has a lock portion 31 which can lock up with the latch 29. An elastic member 32 is mounted between lock member 30 and upper cap 16, or between the lock member 30 and the base 11 so as to bias the lock member 30 to remain in a locking position and allow the lock portion of the lock member 30 to lock up with the latch 29. The lock portion 31 of the lock member 30 is separated from the latch 29 by displacing the lock member 30 against the bias force of elastic member 32.

The disc-bearing mechanism 18 includes a first disc-clamping member 33 secured to the intermittent rotary mechanism 15 so as to rotate with the rotary mechanism 15 in an intermittent manner. A second disc-clamping member 34 is pivotally mounted below the upper cap 16 in a position relative to the first disc-clamping member 33 so as to clamp the disc A between the first and the second disc-clamping member 33 of end 34. An elastic member 35 is installed between the second disc-clamping member 34 and the upper cap 16 to provide a bias force for clamping the disc A between the first and the second disc-clamping members 33 and 34.

The driving mechanism 13 can be a crank slide block mechanism which may include a crank 37 having an axle 36 as its rotation center and a coupling lever 38 wherein one end is pivoted with the crank 37 by means of a pivot pin 39 and the other end is pivoted to the sliding member 23 by means of pivot pin 40.

The driving mechanism 13 further includes a worm 41 and multiple gears 42, 43, 44, 45, 46 and 47. The motor 14 drives the drank 37 which rotate around the axle 36 by means of the worm 41 and gears 42-47 so as to drive the cleaning component 12 to move back and forth along the leading track 17 by means of the coupling lever 38.

The intermittent rotary mechanism 15 includes a gear 48 secured to the second disc-clamping member 34, and a sector gear 49 having at least one fully shaped tooth so as to mesh with the gear intermittently.

Figure 4:
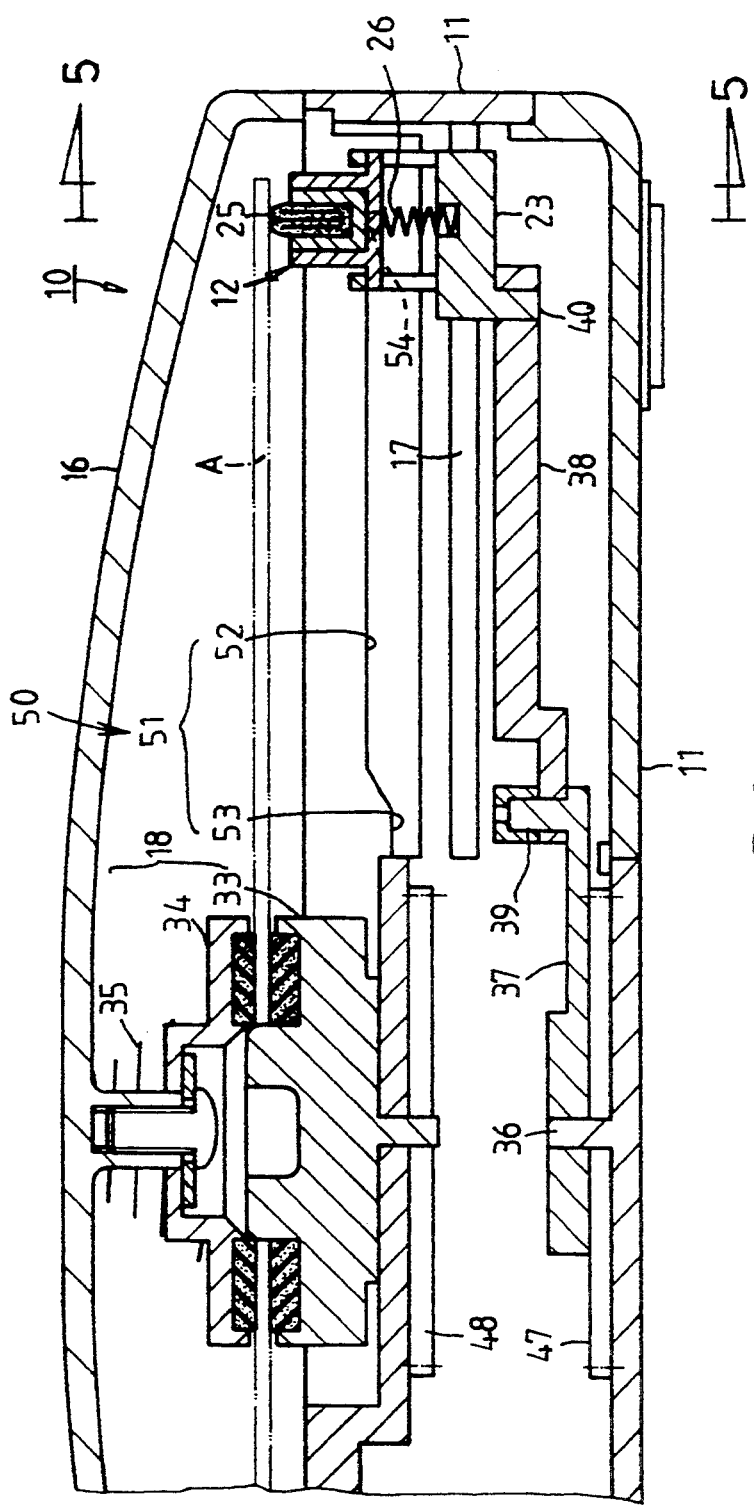
FIG. 4 is a sectional view of another embodiment of the structure of FIG. 3.
Figure 5:
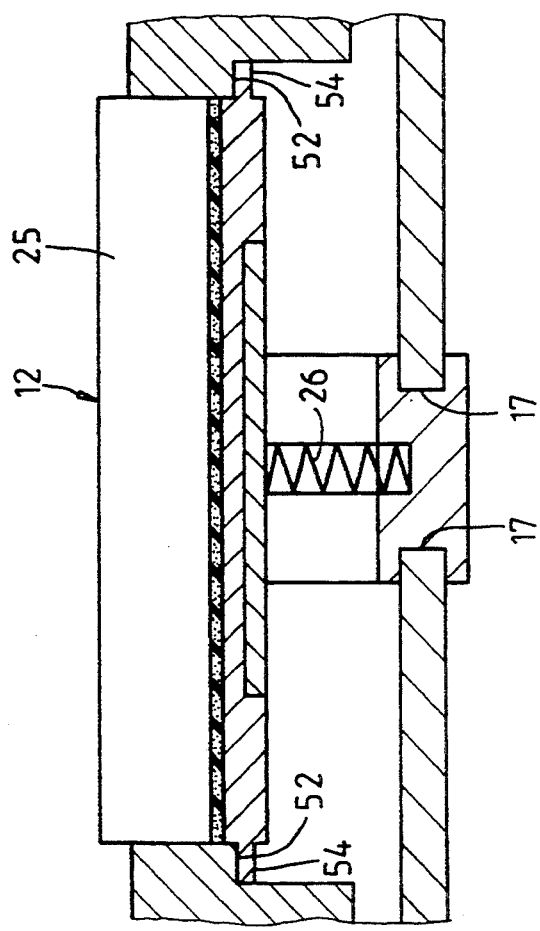
FIG. 5 is a sectional view taken along the section line 5—5 of FIG. 4.

As shown in FIGS. 4 & 5, the automatic cleaning device 10 for a digital signal recording disc further includes a sink-and-float mechanism 50 having a sink-and-float track 51, with a floating portion 52 and a sinking portion 53. The floating portion 52 connects with the sinking portion 53, and the sinking portion 53 may be disposed at one or both ends of the leading track 17. A guided portion 54 is installed at both ends of the cleaning component 12 and slidingly contacts the sink-and-float track 51 so that when it slides to the floating portion 52, the cleaning element 12 will be free to float up and contact the surface of the disc A. When it slides to the sinking portion 53, the cleaning element will be pressed down by the sinking portion 53 and thereby displaced from the surface of the disc A.

As shown in FIG. 3, another embodiment of the sinking-and-floating mechanism 50a is shown to include a sinking portion 53a installed at the center of the base 11, or at the edge of the base 11. A guided portion 54a is installed on the cleaning component 12 such that the guided portion 54a is installed on the cleaning component 12, such that the guided portion 54a can be inserted into the sinking portion 53a and displaced by the sinking portion 53a so that the cleaning element 25 will be displaced from the surface of the disc A.

As shown in FIGS. 1 & 2, the cleaning device has a switch button 55, which when it is pressed down, connects the source of power. When the gear 48 completes a full rotation, the flange 56 of the gear 48 contacts the switch snapper 57 and thereby terminates the power source coupling to the motor.

Figure 6:
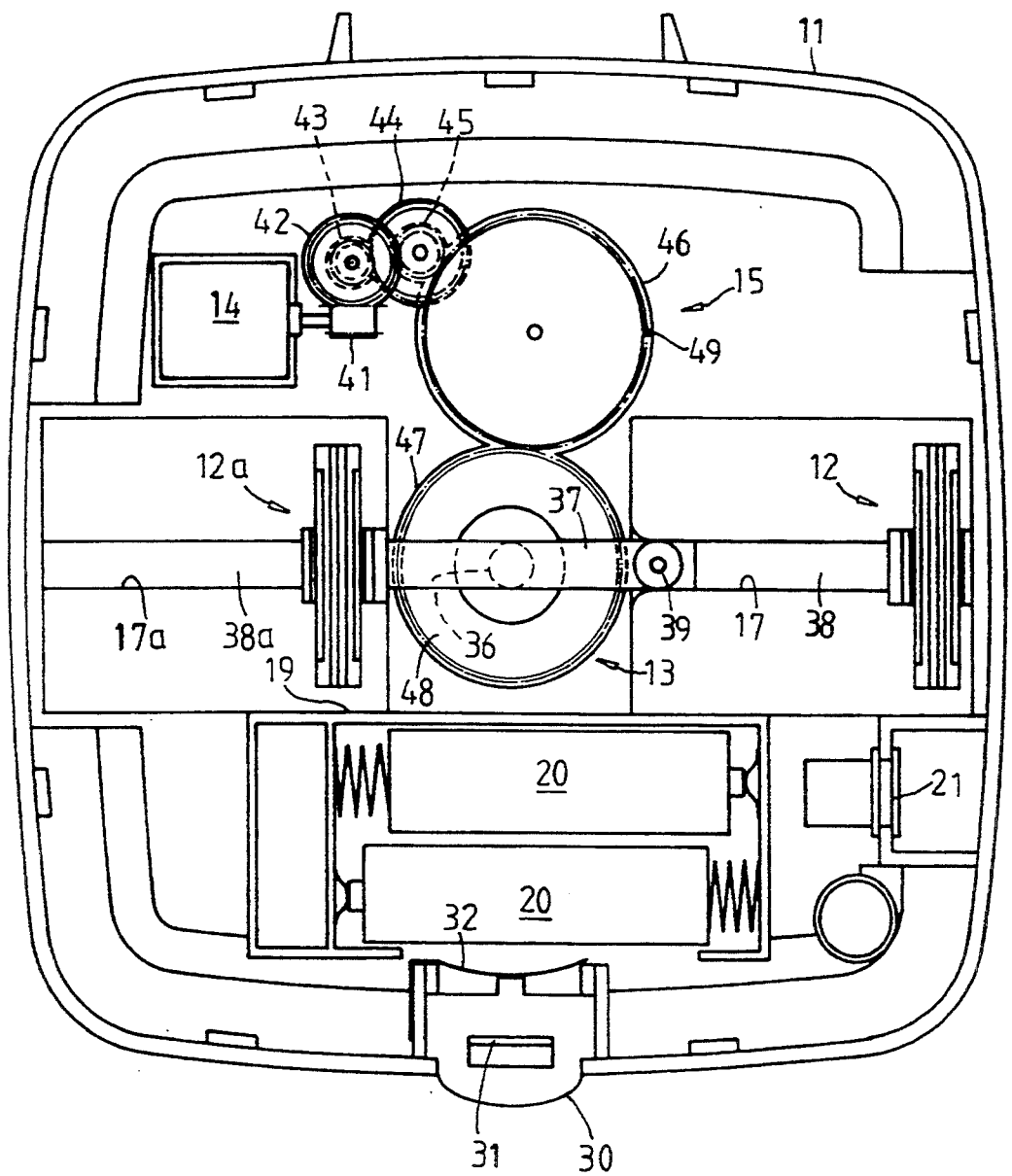
FIG. 6 is a plan view of another embodiment of this invention, with the upper and front caps removed.

As shown in FIG. 6, a leading track 17a is added opposite the track 17. A coupling lever 38a and a unit of cleaning components 12a are added so that the disc is wiped from both sides at the same time, the surface of the disc thereby being cleaned in a more optimized manner.

The characteristics of this invention provide a cleaning device for a digital signal recording disc which can wipe the disc in a direction substantially perpendicular to the nearly circular lines of signal representative recesses formed in the disc surface. In this manner, the wiping direction and the lines of signal representative recesses form a 90 degree intersection angle. It also uses the cleaning element to do both dry and wet cleaning, alternatively of the disc so that the cleaning element has an optimized cleaning effect.

I claim:

1. An automatic cleaning device for a digital signal recording disc comprising:
   a) a base having a leading track and a disc-bearing mechanism for mounting said digital signal recording disc to be cleaned, said leading track extending in a radial direction with respect to the disc;
   b) at least one cleaning component slidingly mounted on the leading track for sliding displacement along the track between an edge and a center of the disc;
   c) at least one driving mechanism mounted between the cleaning component and the base for transforming a rotary motion into a linear motion and drive the cleaning element linearly back and forth along the leading track;
   d) a motor secured to the base and connected to the driving mechanism for driving the driving mechanism;
   e) an intermittent rotary mechanism mounted between the motor and the disc-bearing mechanism for rotating the disc-bearing mechanism intermittently and rotating the digital signal recording disc;
   f) an upper cap pivoted on one side of the base by a pivot shaft; and,
   g) a sink-and-float track located adjacent said leading track, said sink-and-float track having a floating portion and a sinking portion interconnected each to the other, said sinking portion being located on one end of said sink-and-float track, said cleaning component having a guided portion located on opposing ends of said cleaning component and slidingly engaged with said sink-and-float track whereby when said guided portion is displaced to said floating portion said cleaning component contacts a surface of said disc and when said guided portion is displaced to said sinking portion said cleaning component is displaced from said surface of said disc.

2. The automatic cleaning device of claim 1, wherein the cleaning component comprises:
   a) a sliding member slidingly mounted on the leading track of the base;
   b) a cleaning element clamping stand installed on the sliding member, the clamping stand having limited displacement to slide forward and backward relative to the sliding member;
   c) a cleaning element which is inserted in the cleaning element clamping stand and which can be dismounted from the cleaning element clamping stand;
   d) an elastic member fitted between the clamping stand and sliding member for providing resilient displaceability between the cleaning element and the sliding member; and when the cleaning element slides from the center of the disc toward its edge, the cleaning element is inclined in the direction opposite to the sliding direction so that a first edge of the cleaning element will touch the surface of the disc and a second edge of the cleaning element will separate from the surface of the disc; and when the cleaning element slides from the edge of the disc toward its center, the cleaning element is inclined in the direction opposite to the sliding direction so that the second edge of the cleaning element will touch the surface of the disc and the first edge of the cleaning element will separate from the surface of the disc, whereby cleaning solutions may be inserted on one edge of the cleaning element and the surface of the disc can be alternatively wiped in a dry and wet state.

3. The automatic cleaning device of claim 1, further including: a lock mechanism, the lock mechanism including:
   a latch mounted either on the upper cap, or on the base;
   a lock member slidingly mounted either on the upper cap, or on the base when the upper cap or the base does not bear the latch, the lock member having a lock portion for locking with the latch; and
   an elastic member mounted between the lock member and the upper cap, or between the lock member and base so as to force the lock member to remain at the locking position and let the lock portion of the lock member to lock the latch.

4. The automatic cleaning device of claim 1, wherein the track of the base is a straight line.

5. The automatic cleaning device of claim 1, wherein the disc-bearing mechanism comprises:
   a) a first disc-clamping member secured on the intermittent rotary mechanism so as to rotate with the rotary mechanism;
   b) a second disc-clamping member located below the upper cap and pivoted relative to the first disc-clamping member so as to clamp the disc between the first and the second disc-clamping members; and
   c) an elastic member mounted between the second disc-clamping member and the upper cap so as to secure the disc between the first and the second disc-clamping member.

6. The automatic cleaning device of claim 1, wherein the driving mechanism is a slider-crank mechanism.

7. The automatic cleaning device of claim 1, further including:
   a) a sinking portion installed at the center of the base; and
   b) a guided portion installed on the cleaning component, the guided portion being insertable into the sinking portion and thereby displaced by the sinking portion so that the cleaning element will be displaced from contact with the surface of the disc.

* * * * *